United States Patent [19]

Okamura et al.

[11] 4,399,046
[45] * Aug. 16, 1983

[54] FLAME-RETARDANT BUILDING MATERIALS AND METHOD FOR MAKING SAME

[75] Inventors: Tatsuro Okamura, 4-1, Kusae, Ube-shi, Yamaguchi-ken, Japan; Hideki Irifune, Ube, Japan

[73] Assignees: Tatsuro Okamura, Ube; Yoshida Kogyo K. K., Tokyo, both of Japan

[*] Notice: The portion of the term of this patent subsequent to Dec. 14, 1999, has been disclaimed.

[21] Appl. No.: 341,322

[22] Filed: Jan. 21, 1982

[30] Foreign Application Priority Data

Feb. 23, 1981 [JP] Japan .................................. 56-26398

[51] Int. Cl.$^3$ ...................... C04B 43/12; E04B 1/94; E04B 1/74
[52] U.S. Cl. ..................................... 252/62; 252/607; 428/920; 428/921; 106/18.14
[58] Field of Search .................. 252/62, 607; 428/920, 428/921; 106/18.14

[56] References Cited

U.S. PATENT DOCUMENTS 2,353,271 7/1944 Schuh .................................... 252/62
2,386,471 10/1945 Jones et al. ........................... 252/607

FOREIGN PATENT DOCUMENTS 53-93458 8/1978 Japan ...................................... 252/62

*Primary Examiner*—John E. Kittle
*Assistant Examiner*—Robert A. Wax
*Attorney, Agent, or Firm*—Hill, Van Santen, Steadman, Chiara & Simpson

[57] ABSTRACT

The building material of the invention, which is in a disintegrated fluffy form and suitable for shaping into a board for walls and ceilings or as a blow-on or blow-in insulating material having excellent performance as heat and sound insulation, comprises essentially a disintegrated organic fibrous material, e.g. disintegrated scrapped paper and gel-like aluminum hydroxide uniformly blended with the fibrous material together with a flame retardant agent which is preferably an inorganic phosphate such as sodium phosphate and disodium hydrogen phosphate and, optionally, with a waterproofing agent. The building material is prepared by first mixing the organic fibrous material with an aqueous solution of the phosphate and then with an aluminum hydroxide sludge obtained as a noxious industrial waste in aluminum-processing industries employing surface anodization followed by drying and disintegration.

9 Claims, No Drawings

FLAME-RETARDANT BUILDING MATERIALS AND METHOD FOR MAKING SAME

BACKGROUND OF THE INVENTION

The present invention relates to a flame-retardant building material having excellent performance characteristics as heat and sound insulation and suitable for shaping into various kinds of board materials, e.g. for ceilings and walls, as well as for the use as a blow-in or blow-on insulating material. It also relates to a method for making same.

Needless to say, there are currently in use in the building industry a great variety of building materials depending on the requirements for the particular building and locality. The requirements for the building materials are so diversified that one material suitable in a building is not always useful in another. Several characteristics are, however, almost always important in any type of building materials among which, for example, are mechanical strength, nonflammability or flame retardancy and heat and sound insulation as well as inexpensiveness.

In relation to the inexpensiveness of the building materials, there may be obtained two-way advantages simultaneously if an industrial waste can be processed or fabricated into building materials having satisfactory characteristics. These are the solution of the problem caused by the burdensome waste material such as environmental pollution and the commercial benefit obtained with the building materials produced therefrom with outstanding inexpensiveness.

Accordingly there have been made various attempts to utilize useless industrial waste materials for the production of building materials. Unfortunately there are very few examples of success in which excellent building materials suitable for practical use are manufactured from an otherwise useless or rather harmful industrial waste as the main starting material.

Aluminum fabrication plants provide particularly notorious problems due to the difficulties in waste disposal. As is well known, aluminum articles in recent years are used rarely in the as-shaped condition but almost always used after surface finishing.

The method of surface finishing most widely undertaken in the aluminum industry is, of course, a surface anodization in which the surface of the aluminum article is electrolytically oxidized in an acidic electrolyte bath resulting in a thin but dense layer of aluminum oxide and evidencing increased chemical and physical stability as well as beauty. A problem in the anodization treatment of aluminum articles is that a considerable amount of aluminum metal unavoidably is dissolved in the electrolyte bath and the thus dissolved aluminum finally precipitates in the form of amorphous aluminum hydroxide forming a gel-like sludge when the electrolyte solution is neutralized for sewage disposal.

The gel-like sludge usually contains large volumes, e.g. 70 to 90% by weight, of water but is filtrable with great difficulty so that drying up of such an aluminum hydroxide sludge is practically impossible. Therefore, the only way in the art for the disposal of the aluminum hydroxide sludge is to discard it in a land fill or in the ocean in its gel-like form.

Such a method of waste disposal is, of course, not quite acceptable even setting aside the problem of the large cost for the transportation of such a watery waste material to the land fill or to the ocean. For example, a reclaimed land filled with such a gel-like sludge is naturally weak in yield strength of the ground resulting in a decreased utilizability of the land. Discarding of the sludge in the ocean is also faced with regulations to prevent pollution of water. Thus the waste disposal of the gel-like aluminum hydroxide sludge has been the most troublesome problem in the aluminum fabrication industry.

In a copending application Ser. No. 327,021, filed Dec. 3, 1981, the inventors have previously proposed a novel building material with excellent performance of heat and sound insulation as well as flame retardancy manufactured on the basis of the above described very noxious aluminum hydroxide sludge. Application No. 55-178211). The building materials proposed there, however, have several problems in the manufacturing process thereof.

For example, the manufacturing process must be performed by use of a strong alkali such as sodium hydroxide and a strong acid such as phosphoric acid so that accidents are sometimes unavoidable even when good protective means are provided. Further, the manufacturing process should be performed in several steps so that the process is time-consuming and relatively difficult to control. In addition, the process involves a step of slurrying the materials by the addition of a considerable volume of water and the subsequent removal of the water by filtration necessarily takes much labor and time not to mention the problem of sewage disposal of the large volume of polluted water.

SUMMARY OF THE INVENTION

Thus, an object of the present invention is to provide a means for the disposal of the above described noxious aluminum hydroxide sludge in a gel-like form produced in large quantities in the aluminum-processing industries without causing any problems of environmental pollution.

Another object of the present invention is to provide a novel light-weight, flame-retardant building material having excellent performance as heat and sound insulation which can be used in various forms such as fabricated into shaped articles such as wall boards, ceiling boards and the like or as a blow-on or blow-in insulating material to form an insulating layer on the ceiling or on the wall of a building and which can be manufactured from outstandingly inexpensive starting materials such as the above mentioned aluminum hydroxide sludge without the problems in the manufacturing of similar building materials from aluminum hydroxide sludge.

The essential components comprised in the building material of the present invention are aluminum hydroxide in a gel-like form such as in the aluminum hydroxide sludge, an organic fibrous material such as disintegrated scrapped paper and a flame-retardant agent such as an inorganic or organic phosphorus-containing compound. The building material may further comprise a waterproofing agent such as a paraffin emulsion when waterproofness is required and a water-dispersible adhesive such as an aqueous emulsion of an ethylene-vinyl acetate copolymeric resin when control is desired of the cohesiveness, fluffiness and shapeability of the material.

The above described building material of the present invention can be manufactured by a process comprising the steps of admixing and kneading a disintegrated organic fibrous material such as disintegrated scrapped paper with an aqueous solution of a flame-retardant agent which is preferably an inorganic phosphate to impregnate the fibers with the solution, admixing and blending the fibrous material with an aluminum hydroxide sludge of gel-like aluminum hydroxide to form a uniform mass with flowability, drying the flowable mass into a dried material with controlled water content and finally disintegrating the dried material into pieces.

DETAILED DESCRIPTION OF THE PREFERRED EMBODIMENTS

As is understood from the above description, the basic components in the inventive building material are the organic fibrous material and the gel-like aluminum hydroxide obtained in the form of the aluminum hydroxide sludge. The organic fibrous material is of course not limited to particular types, though they are mostly cellulosic, and obtained from various sources such as residues in the factories for fiber-processing, e.g. spinning and weaving. From the standpoint of availability in large quantities, however, the most preferred organic fibrous material is scrapped paper such as scrapped newspaper which is readily disintegrated into a fluffy material.

The fuffly organic fibrous material is admixed and kneaded with an aqueous solution of a flame retardant which is preferably an inorganic phosphate such as sodium phosphate $Na_3PO_4$, disodium hydrogenphosphate $Na_2HPO_4$ and the like. Other flame retardants such as halogen-containing organic phosphorus compounds soluble or not soluble in water may be used according to need. This kneading should be continued until the aqueous solution of the flame retardant has been fully absorbed in the organic fibrous material such as disintegrated scrapped paper. The flame retardant, e.g. phosphates, is effective to reduce the inflammability of and to impart flame retardancy to the organic fibrous material.

In a preferred formulation, the inventive flame-retardant building material comprises from 50 to 70 parts by weight of the organic fibrous material, from 30 to 50 parts by weight of the gel-like aluminum hydroxide and from 10 to 50 parts by weight of the flame retardant agent each calculated on the dry basis.

When sodium phosphate is used as the flame retardant, care should be taken to prevent detrimental effects of the strong basicity thereof on the organic fibrous material or other ingredients. It is therefore preferable that the alkalinity of the mixture is decreased by the addition of, for example, a dilute phosphoric acid.

The next step is blending and kneading of the above obtained mixture with aluminum hydroxide sludge to form a uniform blend in which the gel-like aluminum hydroxide sludge is deposited and adheres to the surface of the organic fibrous material. This aluminum hydroxide itself can impart sufficient flame retardancy to the organic fibrous material by being decomposed into aluminum oxide $Al_2O_3$ when heated in fire while aluminum oxide is highly refractory having resistance to temperatures of 2000° C. or higher so that the flame retardancy of the organic fibrous material is more complete by the synergistic effect of the flame retardant agent and the aluminum hydroxide.

When water-proofness is required of the building material of the invention, a water-proof agent such as a paraffin emulsion or other wax emulsions may be admixed with the blend together with or following the admixture of the aluminum hydroxide sludge.

Following is an example of the formulation of the blend for the inventive building material given in % by weight calculated on a dry basis.

| | |
|---|---|
| Disintegrated scrapped paper | 34% |
| Sodium phosphate | 20% |
| Aluminum hydroxide sludge | 34% |
| Paraffin emulsion | 12% |

The thus obtained blend while still having flowability is then dried and disintegrated. It should be noted that the preferable extent of drying of the blend to be subjected to disintegration is about 20 to 30% water content in the blend since the phosphate and aluminum hydroxide in a completely dried blend may come off the fibers of the disintegrated scrapped paper and may be scattered around in a particulate form in the course of the disintegration.

When scattering of the phosphate and aluminum hydroxide in the particulate form should be completely prevented, it is preferable that the blend before drying is further admixed with an organic adhesive such as an aqueous emulsion type adhesive of a copolymeric resin of ethylene and vinyl acetate. Following is an example of such a formulation of the blend given in % by weight calculated on the dry basis using a halogen-containing organic phosphorus compound as the flame retardant instead of the phosphate.

| | |
|---|---|
| Disintegrated scrapped paper | 32% |
| Flame retardant | 13% |
| Aluminum hydroxide sludge | 32% |
| Ethylene-vinyl acetate resin emulsion | 10% |
| Paraffin emulsion | 13% |

The disintegrated material produced in the above described manner is fluffy and has a very low bulk density exhibiting very excellent performance as heat and sound insulation although good mechanical strength cannot be expected for the material as such.

The inventive building material described above can be employed in several ways given below.

The first way is as a material for shaping various kinds of board-like shaped articles useful for walls and ceilings. In this case, the disintegrated material is again admixed with water so as to be imparted with flowability, preferably, together with a coagulant such as lime and an adhesive. This flowable blend is shaped into a board-like form according to a known procedure and dried to be solidified. The boards thus prepared have high performance as heat and sound insulation as well as good water-proofness and are useful for buildings. It is not necessary that the new building material be shaped by slurrying once dried material. Alternatively, the steps of drying and disintegration are omitted after the admixing of the water-proof agent to the blend, which is directly admixed with a coagulant such as lime and an adhesive and shaped into boards followed by drying to solid form.

The second way is the use as a blow-on or blow-in insulating material. Thus, the disintegrated fluffy material of the invention is blown together with an adhesive by use of a blower gun on to the surface of the walls or ceilings so that a layer of any desired thickness is formed on the surface imparting excellent heat and sound insulation to the walls or ceilings.

Similarly, insulation boards can be manufactured with the inventive disintegrated material by sandwiching the layer of the material formed by blowing in the same manner as above on a plywood board or aluminum plate, if necessary, by use of an adhesive. These insulating boards have not only excellent performance as heat and sound insulation but also good mechanical strength depending on the thickness of the sandwiching boards or plates. The insulating boards are also very satisfactory in respect of flame retardancy or fire resistance when aluminum plates are used for sandwiching the layer of the inventive material.

As is understood from the above description, the advantages obtained by the present invention are very great since building materials of commercial value can be prepared by effectively utilizing aluminum hydroxide sludge which hitherto has been a mere industrial waste disposable only with great difficulty and expense. In addition, the manufacturing process of the inventive material involves no problems of safety because no dangerous chemicals are used for processing. Further, the volume of water used for processing is relatively small so that great saving of time and labor is achieved in the steps of filtration and drying and no problems of sewage disposal are involved in the manufacturing process because little or no polluted water is discharged out of the process. Therefore, the overall cost for the inventive building material is outstandingly low owing to the inexpensiveness of the basic starting materials and the low cost for processing.

What is claimed is:

1. A building material which comprises a disintegrated organic fibrous material and aluminum hydroxide in a gel-like form admixed with a flame retardant agent.

2. The building material as claimed in claim 1 wherein the disintegrated organic fibrous material is disintegrated scrapped paper.

3. The building material as claimed in claim 1 wherein the flame retardant agent is an inorganic phosphate.

4. The building material as claimed in claim 1 which further comprises a waterproofing agent.

5. The building material as claimed in claim 1 which further comprises an organic adhesive.

6. The building material as claimed in claim 3 wherein the inorganic phosphate is sodium phosphate or disodium hydrogenphosphate.

7. The building material as claimed in claim 4 wherein the waterproofing agent is a wax emulsion.

8. The building material as claimed in claim 5 wherein the organic adhesive is an aqueous emulsion of a copolymeric resin of ethylene and vinyl acetate.

9. A method for the preparation of a building material which comprises the steps of
    (a) admixing and kneading a disintegrated organic fibrous material with an aqueous solution of a flame retardant agent to form a mixture in which the organic fibrous material contains the aqueous solution absorbed therein,
    (b) admixing and kneading the mixture with an aluminum hydroxide sludge in a gel-like form to form a blended material in which the aluminum hydroxide sludge is deposited on and adheres uniformly to the surface of the fibers of the organic fibrous material,
    (c) drying the blended material, and
    (d) disintegrating the dried material.

* * * * *